United States Patent
Sethu et al.

(10) Patent No.: US 9,342,441 B2
(45) Date of Patent: May 17, 2016

(54) METHODOLOGY AND TOOL SUPPORT FOR TEST ORGANIZATION AND MIGRATION FOR EMBEDDED SOFTWARE

(71) Applicant: GM GLOBAL TECHNOLOGY OPERATIONS LLC, Detroit, MI (US)

(72) Inventors: Ramesh Sethu, Troy, MI (US); Shige Wang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 14/294,337

(22) Filed: Jun. 3, 2014

(65) Prior Publication Data

US 2015/0347279 A1    Dec. 3, 2015

(51) Int. Cl.
*G06F 11/00* (2006.01)
*G06F 11/36* (2006.01)

(52) U.S. Cl.
CPC ........ *G06F 11/3684* (2013.01); *G06F 11/3636* (2013.01)

(58) Field of Classification Search
USPC ........................................................ 714/38.1
See application file for complete search history.

(56) References Cited

U.S. PATENT DOCUMENTS

| | | | |
|---|---|---|---|
| 2008/0098360 A1* | 4/2008 | Klinger | G06F 8/74 717/128 |
| 2009/0158094 A1* | 6/2009 | Evans | H04L 43/50 714/37 |

* cited by examiner

*Primary Examiner* — Sarai Butler

(57) ABSTRACT

A method of establishing traceability for embedded software systems. A design code database is provided for an embedded software system. A test suite database including a plurality of test cases is structured for testing design code of the embedded software system. The structuring of the test cases provides a correspondence from a respective test case to a respective portion of the design code. A processor receives a design code modification to the embedded software. An associated test case is identified for testing the modified design code being based on traceability data. The associated test case is revised to accommodate the modified design code. The modified test cases are integrated into the test suite. A traceability database establishes a one-to-one correspondence between the modified design coder and the modified test case is updated.

21 Claims, 3 Drawing Sheets

_US 9,342,441 B2_

METHODOLOGY AND TOOL SUPPORT FOR TEST ORGANIZATION AND MIGRATION FOR EMBEDDED SOFTWARE

BACKGROUND OF INVENTION

An embodiment relates generally to embedded software systems.

In automobiles, several vehicle feature functions are handled by electronics and control software applications. Such systems are distributed real-time embedded software systems that require high integrity development and verification processes. Ensuring consistency and correctness of models across the various design steps is critical in development methodologies.

Test cases are created to test the software utilizing a series of commands or instructions that are applied to a device, subsystem or system under test. Development of a suite of test suite having an appropriate coverage over the software is an important step in arriving at the required quality of the subsystem or system.

When a change is made to the software, the test suite must also be changed to verify that the changes operate as expected and that no faults or errors result from the changes. The changed test suite is required to have the same coverage and quality over the changed software.

An issue with the changes is that after a change is made, there is no traceability for easily identifying correspondence between the modified software and the test suite. Typically, changes are made to software and a developer must go through to examine the entire software, identify the change, identify an appropriate set of test cases in the test suite that correlates to the section of the software and make the necessary revisions. The task of locating the correct sections for revision can be a very tedious and time-consuming process.

SUMMARY OF INVENTION

An advantage of an embodiment is the automated traceability correspondence between the software code of the design model and the test cases of the test suite. This technique structures and modularizes both the software code and test suite so that traceability among the elements of each of the test cases in the software code has correspondence for the ease of locating a corresponding combination and readily making changes. This allows an original test suite to migrate from one version of software to a next revised version of software.

Human effort, time, and resources for generating, maintaining and evolving the test suite are reduced. The quality and coverage of the test suite remains unchanged as the software undergoes changes and is uniform independent of the tester.

The automated traceability correspondence technique between the software code of the design model and the test case of the test suite may be used in embedded software systems that include, but is not limited to, monitoring and controlling sensors and actuators utilized in manufacturing and assembly facilities, or in-vehicle embedded software systems.

An embodiment contemplates a method of a method of establishing traceability in embedded software systems. A design code database for an embedded software system is provided. A test suite database is structured. The test suite database includes a plurality of test cases for testing design code of the embedded software system. The structuring of the test cases provides a correspondence from a respective test case to a respective portion of the design code. A design code modification to the embedded software is received by a processor. An associated test case based on traceability data for testing the modified design code is identified by the processor. The associated test case is revised to accommodate the modified design code. The modified test cases are integrated into the test suite. A traceability database establishing a one-to-one correspondence between the modified design code and the modified test case is updated.

DETAILED DESCRIPTION

Figure 1:
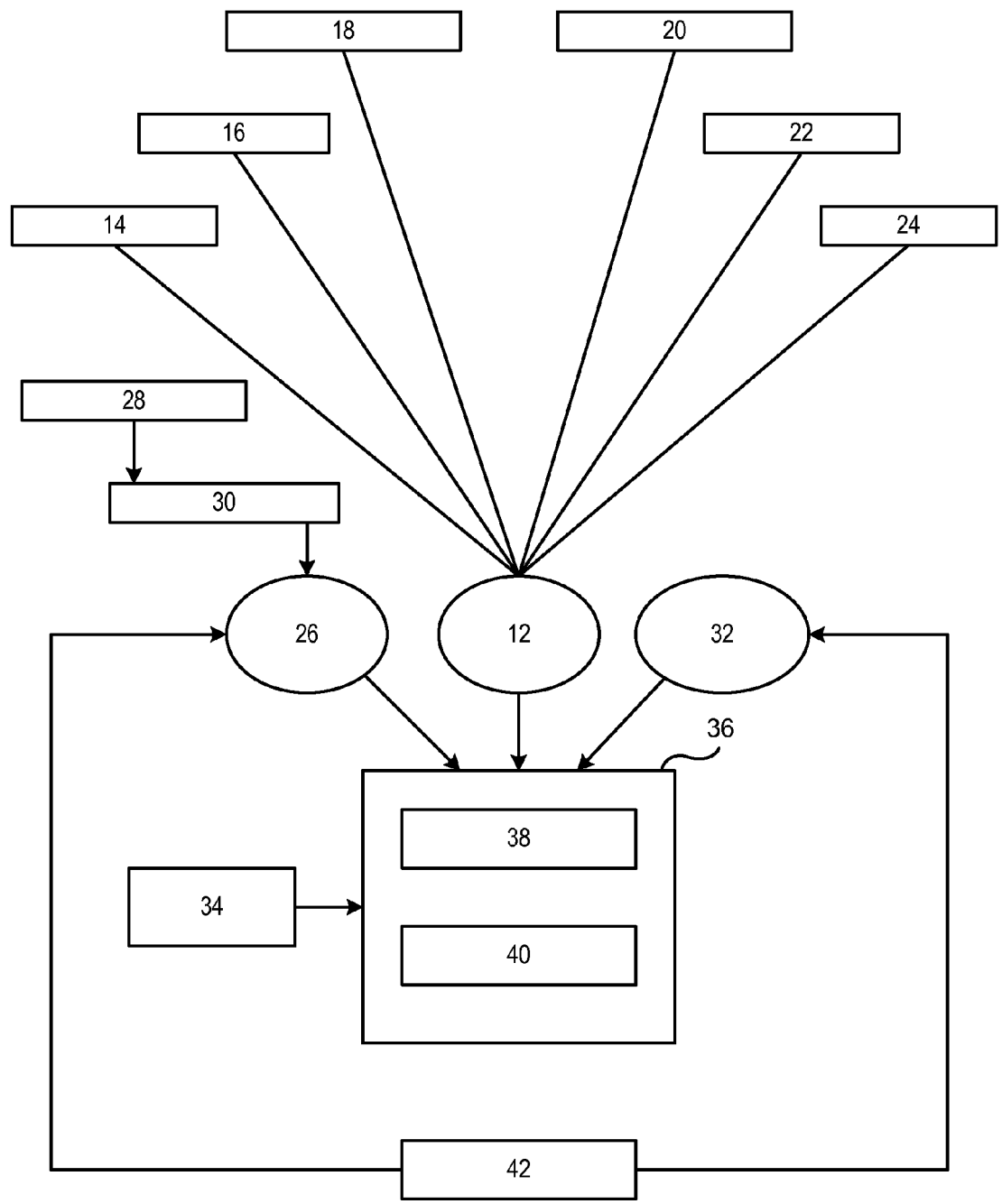
FIG. 1 is a block diagram of the embedded software-test case traceability system.

There is shown in FIG. 1 a block diagram for establishing traceability between software code of a design model and test cases of a test suite. A design model database 12 includes embedded software code of original model to be executed by a processor or controller. Embedded software includes a certain structure that is a collection of general functions 14, input processing functions 16, control computations functions 18, output processing functions 20, diagnostic routine functions 22, and schedule functions 24. These respective functions are modularized for ease of identifying specific sections of the code.

A test suite database 26 includes a plurality of test cases for testing each of the respective functions of the design code. Each respective test case for testing the design code is independently developed, collected, and stored in the test suite database 26. The test cases can be developed either manually or automatically by a test-case generation tool 28. The test-case generation tool 28 generates test-cases for validating respective sections of the design code including those functions described above, and in addition to, but not limited to, timing constraints, fault tolerances, distributed deadlocks, and synchronization at a system integration level for a distributed system.

Prior to storing the test cases in the tests suite database 26, the test cases are organized/modularized so that specific test cases are linked to specific portions of the design code. The test cases are organized or modularized manually or organized by a modularization tool 30. That is, for each respective portion of the design code, a one-to-one correspondence is established between the respective section of the design code and a respective test case designated for a respective section of the design code. The one-to-one correspondence is identified in a traceability database 32. The traceability database 32 maintains the linking relationships between the respective section of the design code in a respective test case so that when a change is made to that respective section of the design code, then the respective set of test cases responsible for testing the respective section of the design code can readily be identified and revised accordingly.

Design model changes, shown generally at 34, are input to a processor 36. In response to the design model changes, the processor 36 also obtains the respective tests from the test suite database 26, the design code from the design model database 12, and traceability linking information from the traceability database 32 that identifies the respective sections of the design code that are being modified. The processor 36 includes a test subset selection module 38 for identifying the respective test cases that corresponds to the respective section of the design code that is being modified using traceability information. The correspondence between the design code in the test suite allows the user to quickly and efficiently identify the respective test case that corresponds to the respective section of the design code being modified.

The revised test cases can be revised manually or automatically. If the test case is revised automatically, then the processor 36 may include a test case revision generator 40 that revises the test case to reflect the changes made to the design code.

In response to the design code changes in the test suite, the information is provided to a test integration compiler 42. The test integration compiler 42 provides the changes in the respective test cases to the test suite database. The previous test cases are replaced by the revised test case in the test suite. In addition, the traceability data that links the revised section of the design code to the revised section of the test suite is stored in the traceability database 32. The traceability information maintains an updated correlation between the design code and the test cases. As a result, the structure of the test suite remains the same.

Figures 2A, 2B:
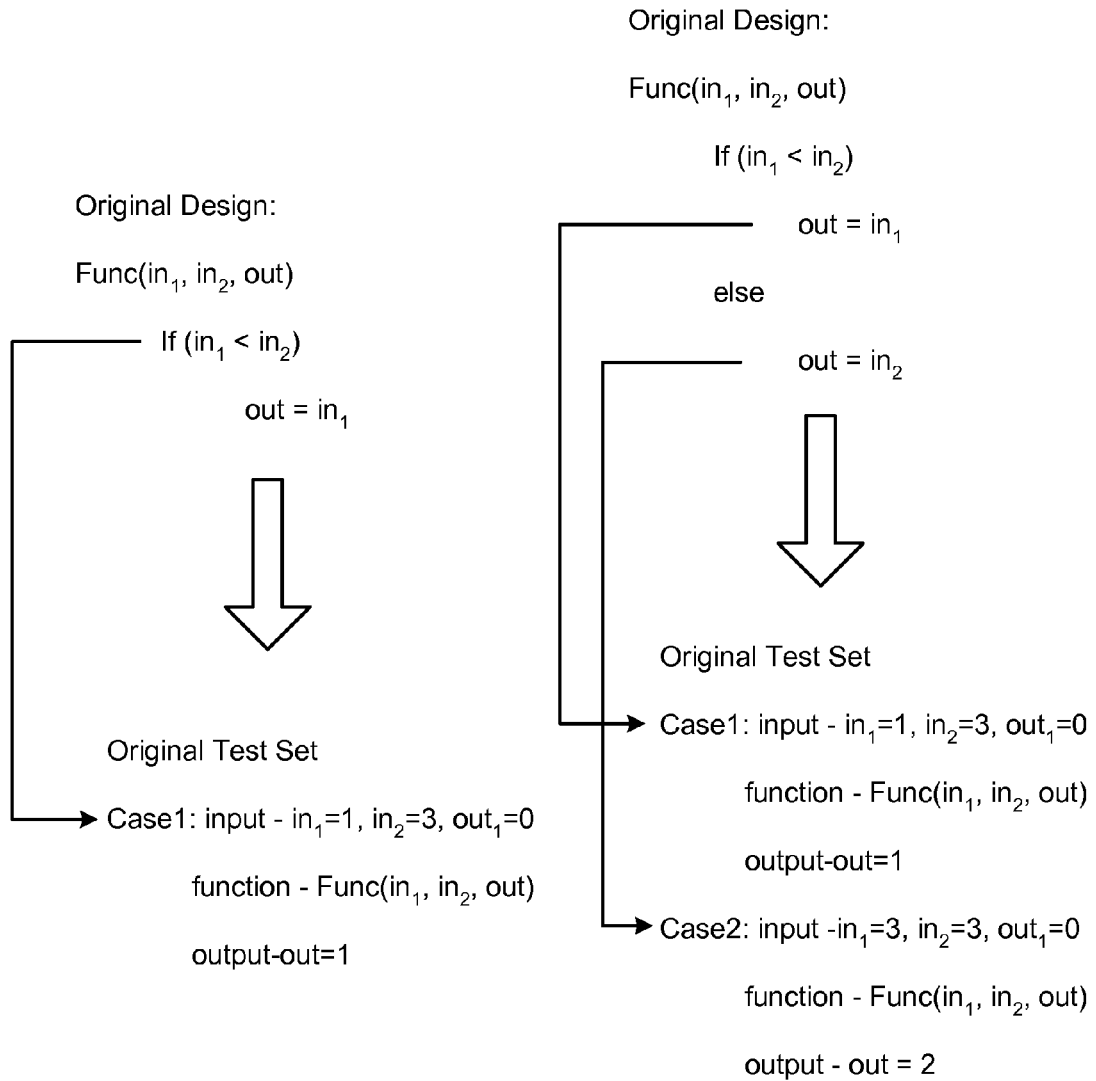
FIG. 2a is an exemplary section of an original design code and an associated original test case.
FIG. 2b is an exemplary section of a revised design code and an associated revised test case.

FIG. 2a illustrates an original design code and an associated original test case. The original design code illustrates an inequality function (e.g., ($in_1 < in_2$)) and an output assignment action (e.g., ($in_1 = out$)). The associated test case is provided for testing the design code. This is illustrated by case 1 as shown in FIG. 2a, FIG. 2b identifies a revised design code that evolves as a result of required changes to the design code. As shown, an assignment action is added to the design code (e.g., out=$in_2$). In response to the design code modification, the test case is modified accordingly to reflect changes to the design code so that revised sections of the design code are tested. As shown in FIG. 2b, an additional test case (e.g., case 2) is generated for testing that section of the revised design code. As a result of the changes to the design code, traceability between the design code and test cases are tracked for supporting evolving software or software migration.

Figure 3:
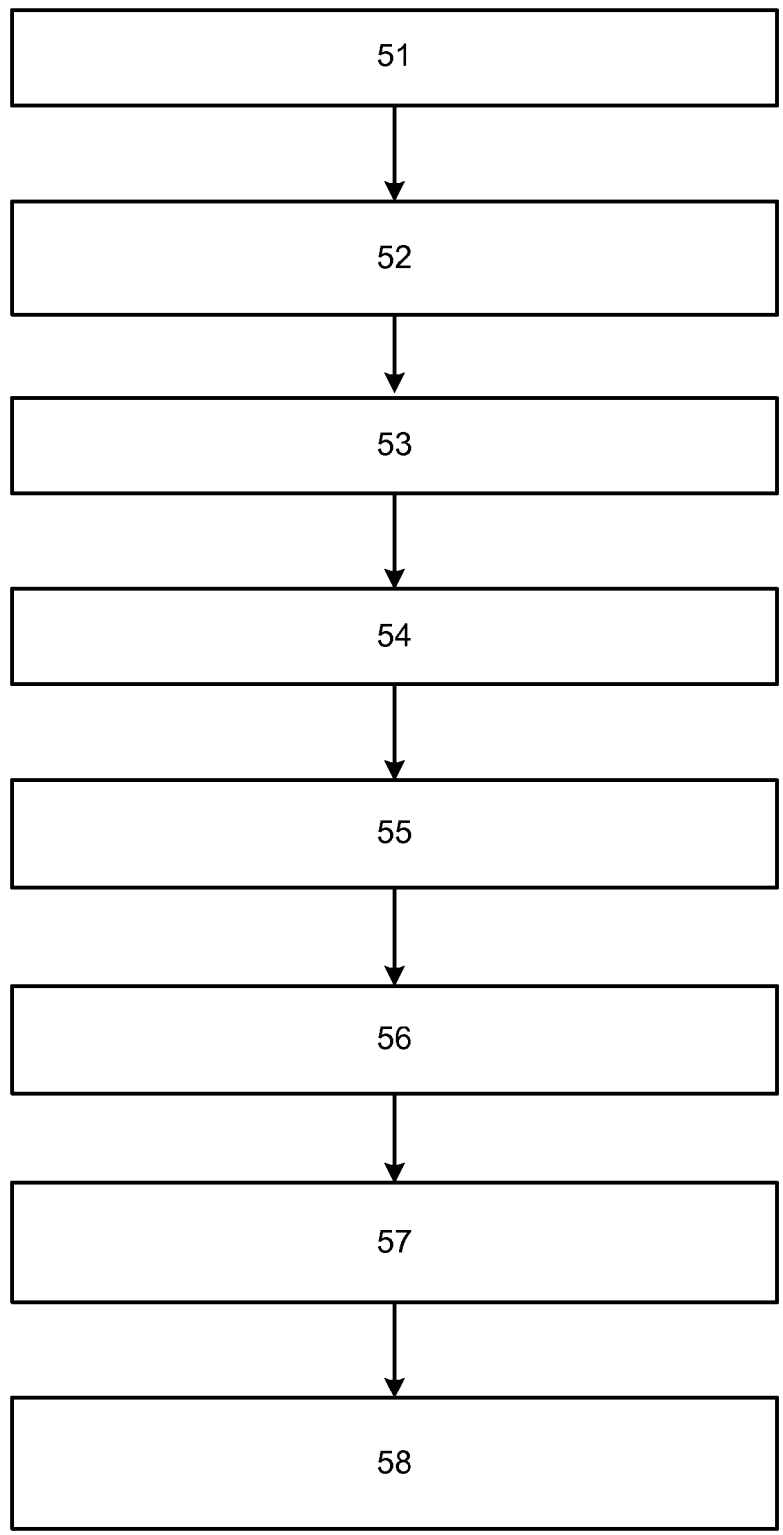
FIG. 3 is a flowchart of a method for establishing traceability for a revised design code.

FIG. 3 illustrates a flow chart for tracking and maintaining the traceability described in FIGS. 2a and 2b. In step 51, the embedded software design code is input to a design code database. In step 52, the embedded software design code, in addition to the test cases in the test suite, are organized and structured for identifying correspondence with a respective test case in the test suite and respective section of the code as illustrated in FIG. 2a.

In step 53, the modification to original code is identified as illustrated by the added condition in FIG. 2b.

In step 54, the processor utilizes traceability data to identify the corresponding section of the test case that relates to the corresponding section of the design code being revised.

In step 55, a revision is made to the original test case to reflect the changes made to the design code as illustrated by case 2 (FIG. 2b).

In step 56, in response to modifying the test case, the revised test case is integrated into the test suite by either the processor or by a separate test integration compiler module.

In step 57, the revised test suite is updated in the test suite database.

In step 58, the traceability database is updated by identifying the linking relationship between the revised section of the design code and the revised section of the test suite. As a result, should further changes be required to this section of the revised code, the respective test cases associated with the revised code can efficiently be identified and modified accordingly by the user. Moreover, since the entire software embedded design code in test suite is structured with a one-to-one correspondence between test cases and design code, test cases that pertain to a particular section of the design code can readily be identified and modified accordingly by any user, even those users unfamiliar with the design code and test cases.

The automated traceability correspondence technique between the software code of the design model and the test case of the test suite may be used in embedded software systems that include, but is not limited to, monitoring and controlling sensors and actuators utilized in manufacturing and assembly facilities, or in-vehicle embedded software systems.

While certain embodiments of the present invention have been described in detail, those familiar with the art to which this invention relates will recognize various alternative designs and embodiments for practicing the invention as defined by the following claims.

What is claimed is:

1. A method of establishing traceability in embedded software systems, the method comprising the steps of:
providing a design code database for an embedded software system;
structuring a test suite database, the test suite database includes a plurality of test cases for testing design code of the embedded software system, the structuring of the test cases provides a correspondence from a respective test case to a respective portion of the design code;
receiving, by a processor, a design code modification to the embedded software;
identifying, by the processor, an associated test case based on traceability data for testing the modified design code;
revising the associated test case to accommodate the modified design code;
integrating the modified test cases into the test suite; and
updating a traceability database establishing a one-to-one correspondence between the modified design code and the modified test case.

2. The method of claim 1 wherein revising the test case includes revising the test case by an automated test case generator.

3. The method of claim 1 wherein revising the test case of the embedded software includes revising a scheduler function, and wherein revising the test case includes revising a test case associated with the scheduler function.

4. The method of claim 1 wherein the scheduler function includes a finite state machine involving states and transitions, wherein the correspondence between test cases and the finite state machine extends to the states and transitions, and wherein a revision of a state or transition in the scheduler function can be traced to a set of test cases for revision.

5. The method of claim 1 wherein receiving the design code modification to the embedded software includes receiving function modifications.

6. The method of claim 1 wherein receiving design code modification to the embedded software includes receiving input processing modifications.

7. The method of claim wherein receiving design code modification to the embedded software includes receiving modifications to control computations.

8. The method of claim 1 wherein receiving design code modifications to the embedded software includes receiving output processing modifications.

9. The method of claim 1 wherein receiving design code modifications to the embedded software includes receiving diagnostic routine modifications.

10. The method of claim 1 wherein the design code modifications are autonomously supplied to the processing unit.

11. The method of claim 1 wherein the design code modifications are manually supplied to the processing unit via a human machine interface.

12. The method of claim 1 wherein the integration of the modified test cases into the test suite is integrated utilizing a test case integration module.

13. The method of claim 12 wherein the test case integration module communicates revised test cases to the test suite database.

14. The method of claim 12 wherein the test case integration module communicates updated traceability data to the traceability database, and wherein the traceability data relates a specific revised design code to a specific revised test case.

15. The method of claim 1 wherein the test cases are manually entered utilizing a human machine interface into the revised test suite.

16. The method of claim 1 wherein the test cases are revised manually and autonomously entered into the revised test suite.

17. The method of claim 1 wherein updating a traceability database by establishing a one-to-one correspondence between the modified design code and the modified test case is utilized in in-vehicle embedded software systems.

18. The method of claim 1 wherein updating a traceability database by establishing a one-to-one correspondence between the modified design code and the modified test case is utilized in embedded software systems for manufacturing facility processes.

19. The method of claim 1 wherein updating a traceability database by establishing a one-to-one correspondence between the modified design code and the modified test case is utilized in embedded software systems monitoring actuators.

20. The method of claim 1 wherein updating a traceability database by establishing a one-to-one correspondence between the modified design code and the modified test case is utilized in embedded software systems controlling actuators.

21. The method of claim 1 wherein updating a traceability database by establishing a one-to-one correspondence between the modified design code and the modified test case is utilized in embedded software systems monitoring sensing devices.

* * * * *